United States Patent Office 3,389,374
Patented June 18, 1968

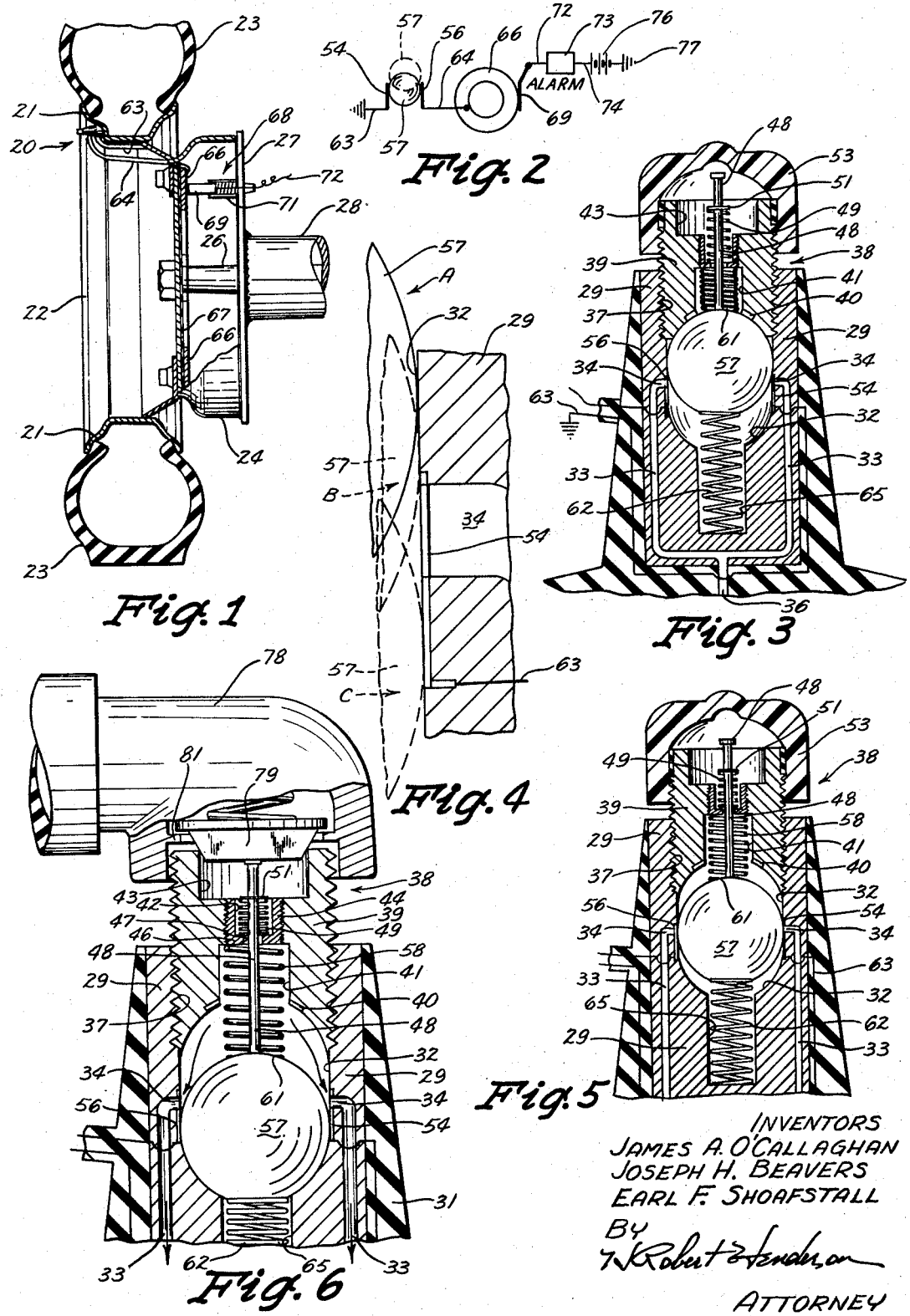

3,389,374
TIRE DEFLATION SIGNAL SYSTEM
James A. O'Callaghan, 210 6th Ave. 50309; Joseph H. Beavers, 625 42nd St. 50312; and Earl F. Shoafstall, 305 E. Shawnee 50313, all of Des Moines, Iowa
Filed June 28, 1965, Ser. No. 467,483
5 Claims. (Cl. 340—58)

ABSTRACT OF THE DISCLOSURE

This invention pertains to an air valve assembly for a conventional vehicle tire, which valve assembly has the dual function of being usable as a conventional air valve to insert air into the tire, and for being connectable in a signal system for indicating when the air pressure within the tire is below a certain pressure such that the safety of the vehicle is in danger. The assembly comprises a housing having a cavity with a pair of passages formed therein, one passage going to the atmosphere, and the other passage going to the interior of the tire, includes as a pair of spaced electrodes which are part of a signal system, which when energized informs the operator that the pressure of a particular tire is low, includes further a ball valve which is movable among a plurality of positions affecting the passages and is operable when in engagement with the electrodes to close an electrical circuit whereby the circuit is energized, includes further spring means for biasing the ball valve toward a certain position, and finally includes an air valve unit operable in response to the use of a conventional air hose to position the ball valve such that the two passages are open to each other whereby air can be transmitted into the interior of the tire.

---

This invention relates generally to a signal system whereby a signal is transmitted if the fluid pressure in a closed container is reduced below a predetermined minimum value. More particularly, the invention relates to a signal system for vehicular tires wherein if the pressure in any one tire goes down for any reason below a predetermined air pressure value, a signal is emitted. The signal is used wherever practicable to indicate to the operator the loss of air pressure.

It is an object, therefore, of this invention to provide an improved device for warning the drive of a vehicle if the pressure in any of the tires is reduced to a predetermined minimum value.

A further object of this invention is to provide an improved tire deflection signal system which can readily be mounted on vehicles without costly modifications to the tire and wheel systems of the vehicle, a device readily mountable in the valve stem of a tire.

Still another object of this invention is to provide an improved device for warning the driver of a vehicle if the pressure in any of the tires is reduced to predetermined minimum value, a device that can be installed in a vehicle repair shop.

Yet another object of this invention is the provision of a tire deflation signal system capable of attaining the objects listed hereinbefore which is economical to manufacture, simple and rugged construction, and effective in operation.

These objects, and other features and advantages of this invention will become readily apparent upon reference to the following description when taken in conjunction with the accompaying drawings, wherein:

FIG. 1 is a cross sectional view of a vehicle wheel system to which a preferred embodiment of this invention is attached.

FIG. 2 is a schematic diagram of the electrical system of this device.

FIG. 3 is a cross sectional view of a preferred embodiment of the device with a ball valve thereof shown positioned by normal tire pressure.

FIG. 4 is an enlarged, fragmentary sectional view showing the ball valve in alternate positions.

FIG. 5 is a cross sectional, fragmentary view of the device showing the ball valve when the pressure in the tire is below the predetermined minimum value.

FIG. 6 is a cross sectional, fragmentary view of the device showing the position of the ball valve when the tire is being inflated.

Referring now the drawings, one embodiment of the invention in the form of a tire deflation signal system is shown generally at 20 (FIG. 1) secured to the rim 21 of a wheel 22.

The wheel assembly consists of a tire 23 (FIG. 1) mounted on the rim 21 of a wheel 22 which is bolted to a hub 24, the axle 26 and backplate 27 of which is welded to an axle housing 28.

The main body of the tire deflation signal system is an elongated housing 29 (FIG. 3) secured to the inside of a valve stem 31 of a tire 23, having an elongated cylindrical cavity 32 therein which is fluidly communicable with the interior of the tire 23 by two diametrically opposite passages 33 formed in the housing 29. The passages 33 are provided with ports 34 leading into the periphery of the cavity 32 at approximately the center thereof. The two passages 33 join at the bottom of the housing 29 before leading into the tire 23 by way of a single passage 36. The cavity 32 is rounded on the bottom and is open at the top 37 thereof, with the top being internally threaded to receive an air valve assembly 38 threaded therein.

The air valve assembly 38 (FIG. 6) includes a threaded cylindrical air valve housing 39 concave in shape on the bottom and having a circular passage 41 bored axially toward on the bottom of the housing 39 and surrounds the entrance to passage 41. Extending upwardly within the housing 39 from the passage 41 is an intermediate passage 42 internally threaded an having a smaller diameter. The intermediate passage 41 opens into a third passage 43 formed in the housing 39, open at the top thereof, and having a diameter greater than that of the first passage 41. Inserted into passage 42 (FIG. 6) is an externally threaded, tubular element 44 open at the top, and having an aperture 47 formed in the base 46 thereof. The base 46 is flush with the upper end of the passage 41 for a purpose hereinafter described.

An elongated plunger 48 (FIG. 3) is inserted through the air valve assembly 38 and extends beyond both ends thereof. Mounted around the plunger 48 is a spring 49 which is secured at one end to a washer 51 fixed to the plunger 48, and which is seated at the other end in the base 46 of the element 44. A valve cap 53 (FIGS. 3 and 5) is threaded on top of the air valve assembly 38 to negate the possibility of inadvertently depressing the plunger 48, and to keep the assembly 38 free of dirt, etc.

Brass electrodes 54 and 56 (FIG. 3) are embedded in the sides of the cavity 32 at diametrically opposite locations, and are positioned to extend axially downwardly from slightly above the inlet port 34 of the passages 33. The electrodes 54 and 56 do not cover the ports 34.

Contained within the cavity 32 (FIG. 3) is a steel ball valve 57 responsive to the air pressure within the tire 23. The ball valve 57 has substantially a zero tolerance within the cavity 32 and is thus capable of reciprocal movement therein while maintaining substantially a fluid tight fit. A spring 58 is mounted in the cavity 32 with one end seated against the base 46 of the element 44, and the other end seated on top of the ball valve 57, to urge the ball valve 57 downwardly within the cavity 32. Counteracting the upper spring 58 is a lower spring 62 which is seated in a tubular bore 65 formed in the bottom of the cavity 32. As described more in detail hereinafter, the lower spring 62 coacts with the air under pressure in the tire to hold the ball valve 57 in an upper position where the upper spring 58 is compressed, and where the ball valve 57 is held above and out of contact with the electrodes. This position is shown in FIG. 3, and in FIG. 4 is shown again by the reference A.

One electrode 54 (FIGS. 1 and 2) is grounded to the wheel 22 by wire 63 while the opposite electrode 56 is electrically communicated by wire 64 with an annular ring 66 mounted in the hub 24 concentrically about the axle 26. The ring 66 (FIG. 1) is insulated from the hub 24 by a rubber pad 67 or other insulating material. Secured to the backplate 27 is a brush assembly 68 consisting of a brush 69 resiliently riding in an electrically conductive brush holder 71. The brush 69 (FIG. 2) is wired at 72 to an alarm 73 mounted normally in the cab of the vehicle, and which in turn is connected by wire 74 to the vehicle's battery 76. The battery 76 is grounded at 77 to the frame of the vehicle.

As shown in FIG. 2, when the ball valve 54 is in its upper position in the cavity 32, as shown by the use of dotted lines (and see FIG. 3 and 57A in FIG. 4), the steel ball valve does not engage the electrodes 54 and 56, thus the circuit of FIG. 2 is open and the alarm 73 non-energized. When, however, the ball valve 54 drops below the upper position to a lower position as shown by the use of full lines in FIG. 2 (and see ball valve 57 in lower positions B and C in FIG. 4 illustrative of the respective positions thereof in FIGS. 5 and 6), the electrodes are connected. As the ball valve 57 is conductive, the circuit is closed, and the alarm 73 energized.

In operation of the signal system 20, if the air pressure within the tire 23 falls below a predetermined minimum value for safety purposes, the upper spring 58 (FIG. 5), having a predetermined pressure rating as does the lower spring 62, will react against the lesser value of the air pressure in the tire 23 coacting with the spring 62, to urge the ball valve 57 from its normal, upper position of FIG. 3 downwardly into a second position as shown in FIG. 5 (see B in FIG. 2). In this position, it contacts the electrodes 54 and 56 thus closing the circuit in the electrical system and activating the alarm 73, thereby warning the operator of the vehicle that the tire 23 is under inflated. In its second position 57, with a substantially zero tolerance within the cavity 32, the ball valve 57 will still be positioned above the inlet ports 34 thus maintaining an airtight system and preventing the air in the tire from escaping through the housing 29.

To inflate the tire 23, a nozzle 78 (FIG. 6) of an air hose (not shown) is placed over the air valve assembly 38. The nozzle 78 includes a spring biased, flat valve member 79 normally seated on an annular shoulder 81. The member 79 engages the plunger 48 and depresses it against the bias of the spring 49, and in turn depresses the ball vale 57 against the bias of the spring 62 and the air under pressure thereunder, until the ball valve is seated in the lower rounded end of cavity 32 (FIG. 6, and see position C of ball valve 57 in FIG. 4). In this position of the member 79, wherein it engages the housing 39 about the periphery of the upper passage 42, further downward movement of the nozzle 78 results in the valve member 79 being lifted off its shoulder 81, whereby air under pressure from the hose is transmitted into the passage 43, thence into the cavity 32, and through the open ports 34 and passages 33 into the tire 23.

When the tire 23 is properly inflated, the air nozzle 78 is removed, whereupon spring 62 urges the ball valve 57 back into the intermediate B position. As soon as the ball valve 57 rises above the ports 34, the air under pressure within the tire moves into the cavity 32 beneath the ball valve, and aided by the spring 62 forces the ball valve to its uppermost position, seated against the annular seal ring 40 (FIG. 3) to thereby provide an airtight seal. In this upper position, the circuit is thus broken, indicating to the operator that the tire is properly inflated. It should be noted that the air pressure within the tire 23 can be readily checked by a conventional gauge (not shown) depressing the plunger 48 and ball 57 to fluidly expose the interior of the tire 23 to the gauge.

Although a preferred embodiment of this invention has been described and disclosed hereinbefore, it is to be remembered that various modifications and alternate constructions can be made thereto without departing from the true spirit and scope of the invention as defined in the appended claims.

We claim:

1. A tire deflation signal system comprising in combination:
    housing means mounted in the valve stem of a tire and having a cavity therein fluidly communicable with the interior of the tire and further having a passage to the atmosphere formed therein;
    an air valve unit mounted in said housing means for controlling the passage of air through said passage;
    normally open electrical contact means mounted in said cavity;
    ball valve means contained within said cavity, said ball valve means operable by said said valve unit to transmit air from the atmosphere through said passage and said cavity to the interior of said tire;
    spring means mounted in said cavity and urging said ball valve means into engagement with said contact means whereby to close said contact means; and
    alarm means electrically connected to said contact means and activated when said contact means is closed; the air pressure within the tire urging the ball valve means out of engagement with said contact means when at normal pressure, whereby loss of pressure results in closing the contact means and activating said alarm means, said ball valve means operable to close off said passage when out of engagement with said contact means.

2. A signal system as defined in claim 1, and including further a second spring mounted in said cavity and engaging said ball valve means, said spring coacting with the air pressure in the tire to hold said ball valve means away from said electrical contact means.

3. A tire deflation signal system comprising in combination:
    housing means mounted in the valve stem of a tire and having therein an elongated cylindrical cavity fluidly communicable with the interior of the tire by a first passage and further having a second passage to the atmosphere controlled by an air valve unit;
    normally open diametrically opposite electrodes embedded in the sides of said cavity;
    ball valve means reciprocally movable within said cavity and having substantially a zero tolerance therewith, said ball valve means movable to either of three positions, wherein a normal position said ball valve means is spaced above said electrodes and said passages are closed off from each other, in a second position said ball valve means is in contact with said electrodes, and in a third position said ball valve is below said first passage and said passages are open to each other;
    spring means mounted in said cavity and urging said ball valve means into engagement with said electrodes whereby to close said electrodes; and
    alarm electrically connected to said electrodes and activated when said electrodes are closed; the air pressure within the tire urging the ball valve means out of engagement with said electrodes when at normal pressure, whereby loss of pressure results in closing the electrodes and activating said alarm means;
    said air valve operable to move said ball valve means to said third position.

4. A signal system as defined in claim 3, and including further a second spring mounted in said cavity and engaging said ball valve means, said spring coacting with the air pressure in the tire to hold said ball valve means away from said electrodes.

5. A tire deflation signal system comprising in combination:
housing means mounted in the valve stem of a tire and having therein an elongated cylindrical cavity fluidly communicable with the interior of the tire by a first passage and further having a second passage to the atmosphere;
an air valve unit mounted in said housing means and operable to open said passages to each other;
normally open, diametrically opposite electrodes embedded in the sides of said cavity;
a ball valve contained within said cavity and responsive to the air pressure within the tire, said ball valve having substantially a zero tolerance within said cavity said ball valve having three positions, wherein in a normal position and said ball valve is spaced above said electrodes, in a second position said ball valve is in contact with said elecrodes, and in a third position said ball valve is below said first passage to allow inflation of the tire;
spring means mounted in the top of said cavity and urging said ball valve against the air pressure within the tire and into said second position;
a second spring mounted in the bottom of said cavity and engaging said ball valve, said second spring coacting with the air pressure in the tire to bias ball valve toward said normal position;
alarm means electrically connected to said electrodes and activated when said electrodes are closed, the air pressure within the tire urging the ball valve means toward said normal position when at normal pressure whereby loss of pressure results in closing the electrodes and actuating said alarm means; and
plunger means projecting from the base of said air valve unit and engaging said ball valve means, said plunger operable to depress said ball valve means to to fluidly communicate the interior of the tire to the atmosphere via said second passage.

References Cited
UNITED STATES PATENTS 1,932,428   10/1933   Swezey _____ 200—61.25

JOHN W. CALDWELL, *Primary Examiner.*

ALVIN H. WARING, *Examiner.*